Nov. 17, 1936.  L. E. LA BRIE  2,060,873
BRAKE APPLYING MEANS
Filed May 9, 1923   3 Sheets-Sheet 1
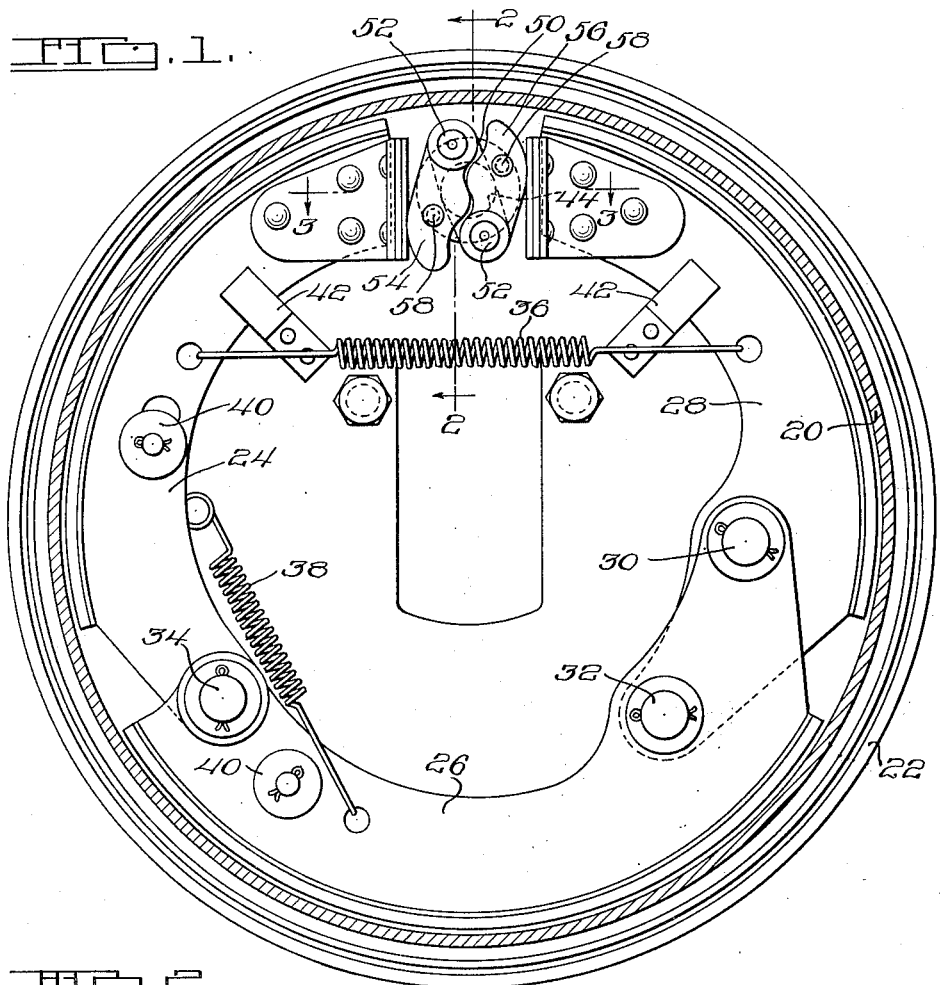
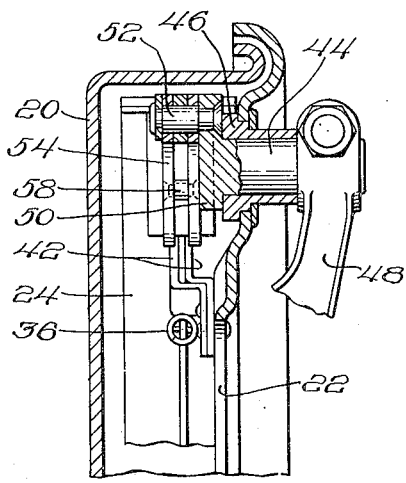
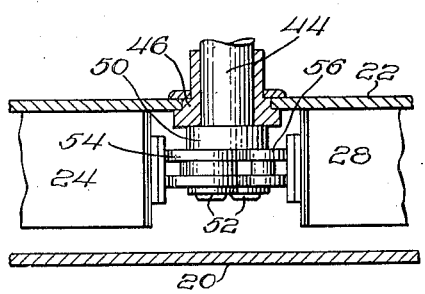
INVENTOR
Ludger E. LaBrie
BY
M. W. McConkey
ATTORNEY Nov. 17, 1936.    L. E. LA BRIE    2,060,873
BRAKE APPLYING MEANS
Filed May 9, 1923    3 Sheets-Sheet 2

INVENTOR
Ludger E. LaBrie
BY
Jn. W. McConkey
ATTORNEY

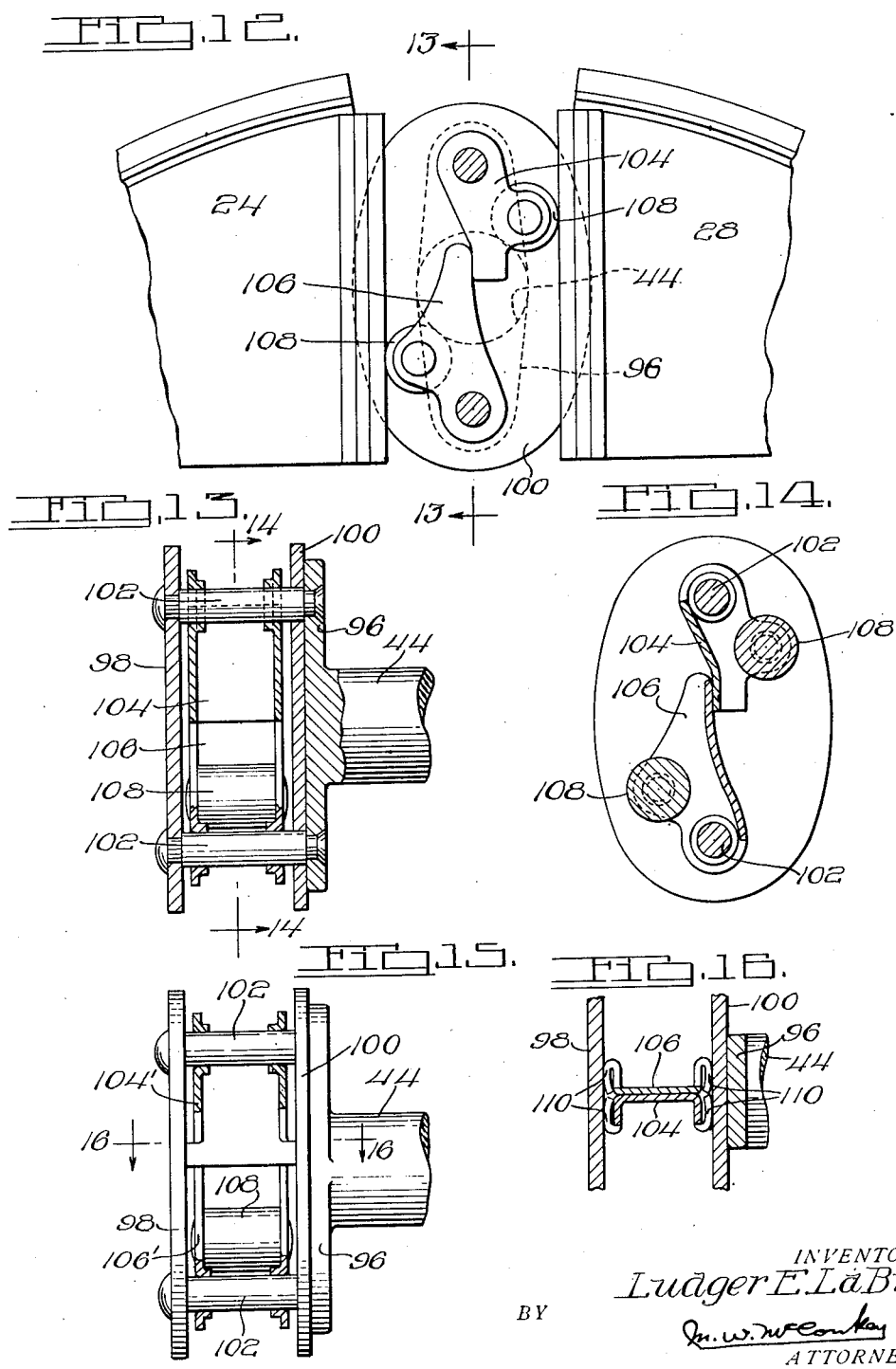

Patented Nov. 17, 1936

2,060,873

UNITED STATES PATENT OFFICE 2,060,873

BRAKE-APPLYING MEANS

Ludger E. La Brie, South Bend, Ind., assignor to Bendix Brake Company, South Bend, Ind., a corporation of Illinois Application May 9, 1928, Serial No. 276,217

18 Claims. (Cl. 188—78)

This invention relates to brakes, and is illustrated as embodied in an internal expanding automobile brake. An important object of the invention is to provide a simple and inexpensive brake applying device having a balancing action, to distribute the brake applying force between the shoes or their equivalent, and yet which preferably can be operated by non-shifting means such as a shaft journaled in a fixed bearing. The device in the forms illustrated forms in effect a novel compound balancing cam.

It is desirable that the thrust members which engage the shoes or other friction means should be pivoted at their ends, preferably on pivots extending one above the other between the shoe ends in a plane generally parallel to the shoe ends, the thrust members being in balancing engagement with each other as described above, and if desired being provided in a novel manner with anti-friction rollers engaging the shoe ends.

The above and other objects and features of the invention, including various novel and desirable details of construction, will be apparent from the following description of several illustrative embodiments shown in the accompanying drawings, in which:

Figure 1 is a vertical section through the brake, just inside the head of the brake drum, and showing the brake shoes in side elevation;

Figure 2 is a partial radial section showing the brake applying means, on the line 2—2 of Figure 1;

Figure 3 is a partial section through the brake applying means at right angles to Figure 2, on the line 3—3 of Figure 1;

Figure 5:
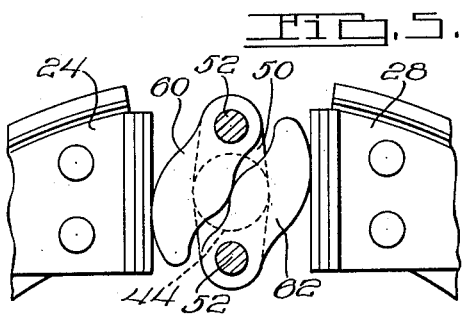
Figure 5 is a section through the means of Figure 4, on the line 5—5 of Figure 4.
Figure 6:
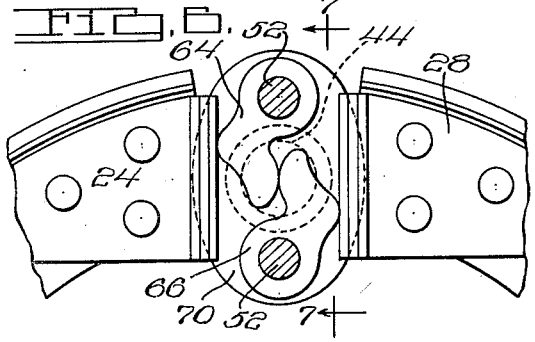
Figure 6 is a section corresponding to Figure 5, but showing a third modification of the applying means.
Figure 7:
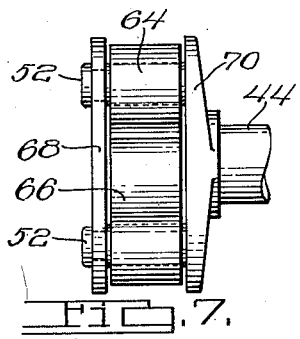
Figure 7 is a section on the line 7—7 of Figure 6, showing the applying means in side elevation.

Figures 8, 9, 10, 11, and 12 are sections corresponding to Figures 5 and 6, but each showing a different modification of the applying means;

Figure 13 is a radial section through the applying means of Figure 12, on the line 13—13 of Figure 12;

Figure 14 is a central section through the applying means of Figures 12 and 13, on the line 14—14 of Figure 13;

Figure 15 is a side elevation corresponding to Figure 7, but showing a further modification more nearly like the modification of Figures 12-14; and Figure 16 is a horizontal section through the applying device of Figure 15, on the line 16—16 of Figure 15.

The illustrated brake includes a rotatable drum 20, at the open side of which is a support such as a backing plate 22, and within which is the friction means, shown as including a primary shoe 24, a secondary shoe 26, and an auxiliary shoe 28. The secondary shoe is formed with two parallel stiffening webs, extended to form pivot arms mounted on an anchor 30 carried by the backing plate 22.

Shoes 24 and 28 have single stiffening webs, projecting at their lower ends between the webs of shoe 26 as pivot arms, shoe 28 being mounted on a fixed anchor 32 carried by backing plate 22 while shoe 24 is connected to shoe 26 by a floating pivot 34. Anchor 30 passes through a relatively large opening in the web of shoe 28, while anchor 32 passes through relatively large openings in the two webs of shoe 26, so that the anchors do not interfere with the pivotal movement of the shoes.

The brake is applied by forcing shoes 24 and 28 apart against the resistance of a return spring 36, whereupon shoe 24 applies shoe 26 against the resistance of an auxiliary return spring 38. The shoes may be provided with suitable steady-rests 40. Preferably shoes 24 and 28 are guided by novel positioning means including pairs of members 42 having their lower ends superposed and riveted or otherwise secured to the backing plate 22, and having their upper ends spread apart to embrace the webs of the shoes.

An important feature of the invention relates to the applying means for forcing apart the shoes 24 and 28 to apply the brake. In the embodiment of Figure 1-3, the applying means includes an operating shaft 44 journaled in a bearing 46 secured to the backing plate 22, and having an operating lever 48 at its end. Shaft 44 has at its end a cross member, shown as an integral cross-head 50, having a pair of pivots 52 arranged one above the other and projecting between the ends of shoes 24 and 28. A pair of novel thrust members 54 and 56 are mounted at their ends on pivots 52, and have interengaging portions between their ends to cause the thrusts on the two members to balance. The members 54 and 56 are formed at the ends opposite the pivoted ends with cam surfaces engaging the ends of shoes 24 and 28.

Rotation of shaft 44 turns the members 54 and 56 as a unit, to apply the brake by forcing shoes 24 and 28 apart, with the thrusts on the shoes balanced against each other. The distribution of the thrusts on the two shoes depends on the ratio of the effective lever arms of the two members 54 and 56,—that is, of the distances from pivots 52 to the point of interengagement of members 54 and 56,—and is equal on the two shoes where members 54 and 56 are interchangeable as shown. Members 54 and 56 are shown as built up in a laminated cam structure of three stampings, the two outer ones having the desired cam contour and the center one being smaller and serving merely as a spacer, the three stampings preferably being permanently secured together by means such as a rivet 58.

Figure 4:
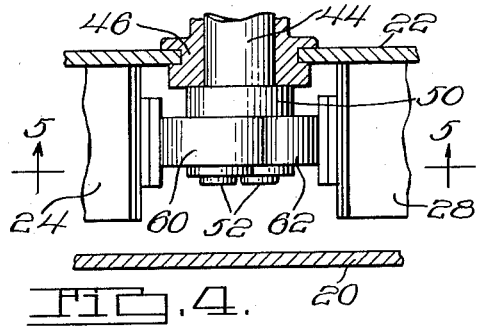
Figure 4 is a section corresponding to Figure 3, but showing a different modification of the applying means.

The applying device of Figures 4 and 5 differs from that of Figures 1–3 principally in that the thrust members 60 and 62 are solid integral cam members instead of being laminated, and are slightly different in shape.

In Figures 6 and 7, the thrust members 64 and 66 engage each other at the ends opposite the pivoted ends, instead of between their ends, and have thrust projections between their ends which engage the shoes 24 and 28. Also, in place of the crosshead 50, there are two cross members 68 and 70, the latter preferably integral with shaft 44, and between which the thrust members 64 and 66 are arranged, and which are permanently connected in spaced relation by the pivots 52. Cross members 68 and 70 are enough larger than the thrust members between them so that they project past the sides of the shoes 24 and 28 and embrace the shoe ends between them.

Figure 8:
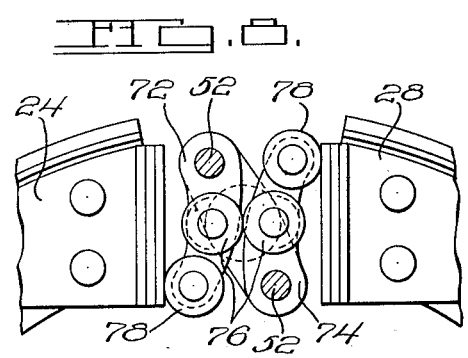

In the arrangement of Figure 8, thrust members 72 and 74 have anti-friction rollers 76 between their ends in balancing engagement with each other, and other anti-friction rollers 78 engaging the shoe ends.

Figure 9:
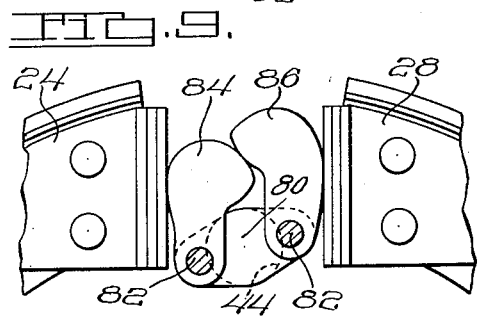
Figure 10:
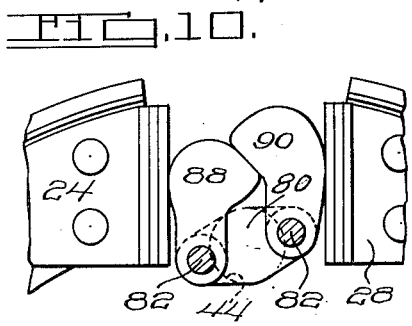
Figure 11:
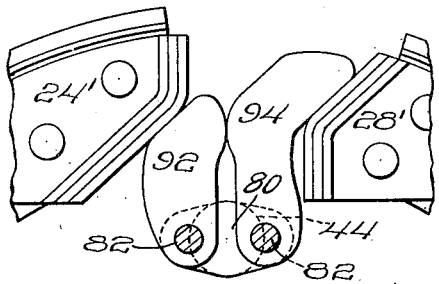

In Figures 9, 10, and 11, the crosshead 80 of shaft 44, corresponding to the crosshead 50, has pivots 82 in a plane perpendicular to the plane of pivots 52 in Figure 1. Thrust members 84 and 86 (Figure 9), 88 and 90 (Figure 10), and 92 and 94 (Figure 11) are mounted on pivots 82 and extend upwardly generally parallel to each other between the shoe ends. The thrust members 92 and 94, Figure 11, require special wedge surfaces on the shoe ends, as shown.

The modification of Figures 12–14 includes a crosshead 96 on shaft 44, parallel plates or stampings 98 and 100 corresponding to cross members 68 and 70 and which embrace the shoe ends between them, and which are permanently secured in spaced relation by pivots 102, together with channel-shaped thrust members 104 and 106 of stamped steel. Members 104 and 106 have their unpivoted ends in balancing engagement, and are provided with antifriction rollers 108 engaging the shoe ends.

The arrangement of Figures 15 and 16 differs from that of Figures 12–14, in that the thrust members 104' and 106' have portions 110 frictionally gripping the cross members 98 and 100. This prevents pivoting movement of the thrust members when the brake is released, while permitting the described balancing movement when the brake is applied, at which time there is enough force acting on the applying device readily to overcome the friction of portions 110.

While a number of illustrative embodiments have been described in detail, it is not my intention to limit the scope of the invention to those particular embodiments, or otherwise than by the terms of the appended claims.

I claim:

1. A brake comprising, in combination with friction means having separable ends, an applying device including two thrust members pivoted at their ends and having interengaging portions to balance the thrust of one against the thrust of the other and which engage said first ends respectively, together with means for moving the thrust members bodily as a unit to force said ends apart.

2. A brake comprising, in combination with a drum and a backing plate and friction means housed between the drum and the backing plate, an applying device also arranged between the drum and backing plate and acting on said friction means and including two thrust members pivoted at their ends and having interengaging portions to balance the thrust of one against the thrust of the other, together with means for moving the thrust members bodily as a unit to act as a compound balanced cam.

3. A brake applying device including two thrust members pivoted at their ends and having interengaging portions between their ends to balance the thrust of one against the thrust of the other and having shoe-engaging portions adjacent their opposite ends, together with means for moving the thrust members as a unit to function as a compound balanced cam.

4. A brake applying device including two thrust members pivoted at their ends and having interengaging portions adjacent their opposite ends to balance the thrust of one against the thrust of the other and having shoe-engaging portions between their ends, together with means for moving the thrust members as a unit to function as a compound balanced cam.

5. A brake having an applying device comprising, an angularly-movable operating device, a pair of thrust members operated thereby and balanced against each other, and means for frictionally resisting balancing movement of said members relatively to said device, said applying device being wholly within said brake.

6. A brake having an applying device comprising, an angularly-movable operating device, a pair of thrust members pivoted thereon and balanced against each other, and means for frictionally resisting balancing movement of said members relatively to said device, said applying device being located within said brake.

7. A brake having an applying device comprising, an operating member, and a pair of thrust members operated thereby and balanced against each other and which have parts frictionally gripping the operating member, said applying device being located within said brake.

8. A brake applying device comprising, in combination, an angularly movable operating member having spaced portions connected by pivots, and thrust members arranged between the spaced portions and mounted at their ends on said pivots and which are balanced against each other.

9. A brake applying device comprising, in combination, a shaft having at its end two cross members connected by pivots, and thrust members mounted respectively on said pivots between the cross members and in balancing engagement with each other and in frictional engagement with the cross members.

10. A brake comprising, in combination, friction means having separable ends, an operating member adjacent said ends having a pair of parallel pivots projecting between said ends in a plane generally parallel to the faces of said ends, and thrust members mounted on said pivots at their ends and engaging said ends of the friction means and which are also in balancing engagement with each other.

11. A brake comprising, in combination, friction means having separable ends, an operating member adjacent said ends having a pair of parallel pivots projecting in a plane generally perpendicular to the faces of said ends, and thrust members mounted on said pivots at their ends and engaging said ends of the friction means and which are also in balancing engagement with each other.

12. A brake applying device comprising, in combination, a pair of pivoted thrust members in balancing engagement with each other and provided with anti-friction rollers for engagement with brake friction means, and means for operating said members as a unit to apply a brake.

13. A brake applying device comprising, in combination, an operating device having a pair of spaced pivots, a channel-shaped pressed metal thrust member mounted on each pivot, with the two members in balancing engagement with each other, and an anti-friction roller mounted within the channel of each thrust member.

14. A brake applying device comprising, in combination, an operating device having a pair of spaced pivots, a thrust member mounted on each pivot, with the two members in balancing engagement with each other, and an antifriction roller mounted on each thrust member.

15. An expansion device for a brake comprising a member rotatable about a fixed axis, a pair of arms pivotally mounted at opposite ends of said member, said arms being interconnected and extending substantially parallel in opposite directions from the points of pivotal mounting, the ends of said arms being adapted to force parts of said brake into engagement whereby rotation of said member causes the ends of said arms to move relatively away from each other to actuate said brake.

16. An expansion device for a brake comprising a member rotatable about a fixed axis, a pair of arms pivotally mounted at opposite ends of said member, said arms being interconnected and extending substantially parallel in opposite directions from the points of pivotal mounting and arranged to swing in a plane normal to the axis of the brake, and parts carried by the brake friction means and contacting with the ends of said arms for transmitting force from said device to the friction means.

17. An expanding device for a brake adapted to deliver compressive force in opposite directions, said device comprising a rotatable member having arms pivoted at its ends, said arms carrying interengaging means generally in line with the points of pivotal mounting, said arms extending parallel and in opposite directions from said points and engaging the friction means of the brake at their ends, the point of engagement of each of said arms being substantially at the same elevation as the point of pivotal mounting for the other of said arms, whereby rotation of said member applies balanced forces to the friction means.

18. An expanding device for a brake adapted to deliver compressive forces in opposite directions, said device comprising a member rotatable about a fixed axis and having arms pivoted at its ends, said arms carrying interengaging means generally in line with the points of pivotal mounting, said arms extending parallel and in opposite directions from said points and engaging adjacent ends of the brake friction means at the ends of the arms, the point of engagement of one of said arms being below the said axis.

LUDGER E. LA BRIE.